Figure 1:
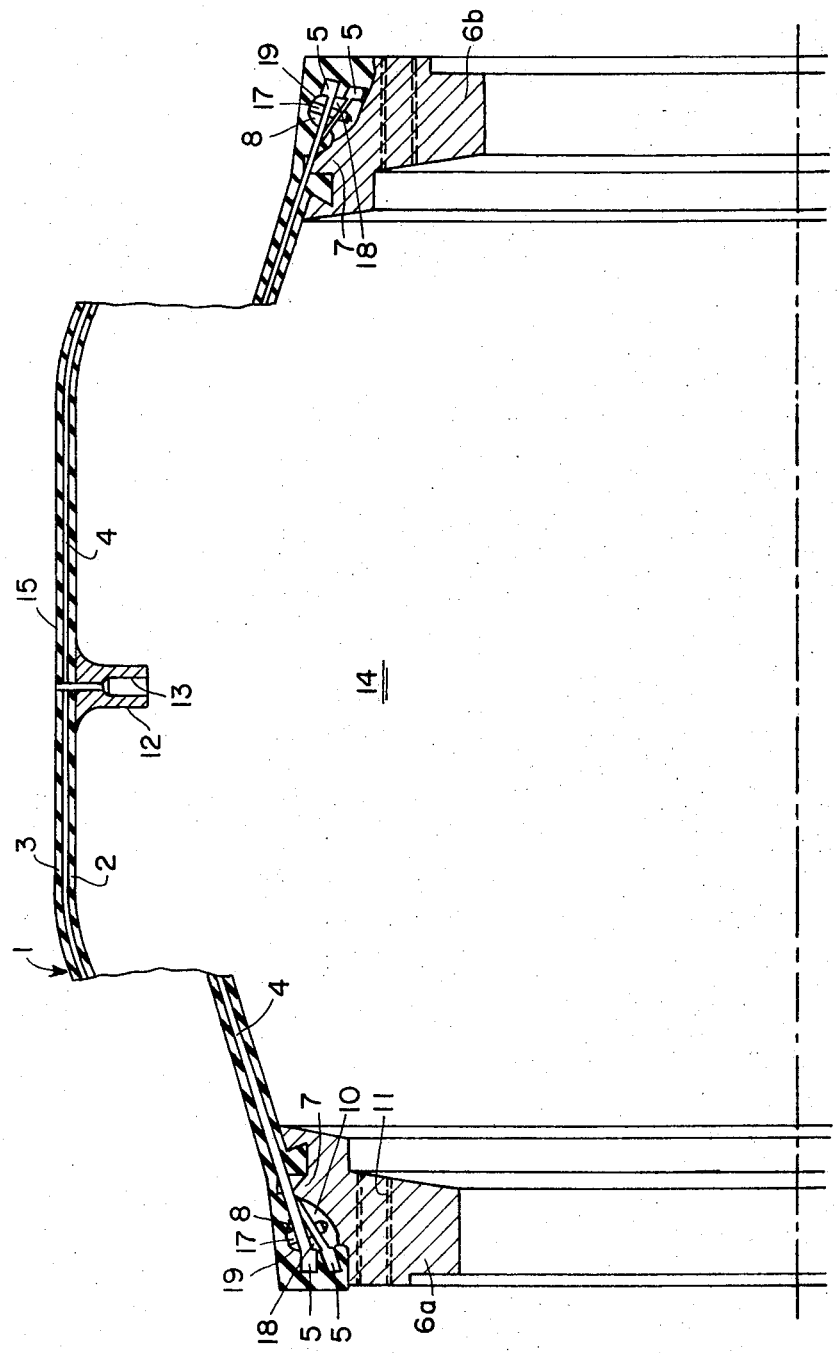

United States Patent [19]
Evans et al.

[11] 3,830,679
[45] Aug. 20, 1974

[54] DIAPHRAGM

[75] Inventors: Philip J. Evans, Birmingham; John F. Askam, Sutton Coldfield, both of England

[73] Assignee: Dunlop Limited, London, England

[22] Filed: Aug. 9, 1972

[21] Appl. No.: 279,230

[30] Foreign Application Priority Data
Aug. 12, 1971 Great Britain.................... 37836/71

[52] U.S. Cl.................... 156/416, 425/52, 425/53, 425/43
[51] Int. Cl..... B29h 3/042, B29h 5/02, B29h 17/00
[58] Field of Search.......................... 425/49, 51–53; 156/416

[56] References Cited
UNITED STATES PATENTS
2,869,180  1/1959  Fassero et al..................... 425/53 X
3,192,570  7/1965  Branick............................ 425/49 X
3,342,663  9/1967  Pouilloux.......................... 156/416
3,396,221  8/1968  Balle et al........................ 425/52 X

*Primary Examiner*—J. Howard Flint, Jr.
*Attorney, Agent, or Firm*—Stevens, Davis, Miller & Mosher

[57] ABSTRACT

An annular wire reinforced rubber shaping diaphragm comprises a layer of rubber having embedded therein a plurality of individual metal wires, said wires being disposed substantially at right angles to the mid-circumferential plane of the diaphragm. An end ring is provided at each axially outer edge of said diaphragm, each end of each wire being anchored to its respective end ring, of which the following is a specification.

15 Claims, 2 Drawing Figures

DIAPHRAGM

This invention relates to wire-reinforced rubber shaping diaphragms, particularly to the cylindrical or barrelled shape diaphragms for shaping green pneumatic tires or tire carcasses from a substantially cylindrical shape to the toroidal shape of a finished tire.

According to the invention, an annular wire reinforced rubber shaping diaphragm comprises a layer of rubber in which a plurality of individual wires are embedded, said wires being disposed substantially at right angles to the mid-circumferential plane of the diaphragm, and an end ring at each axially outer edge of said diaphragm, each end of each wire being anchored to its respective end ring.

The word "rubber" as used in this specification denotes any suitable curable elastomeric material.

The diaphragm preferably comprises a diaphragm for shaping radial-ply tires.

The diaphragm may be provided with at least one valve communicating between the interior of the diaphragm and a surface of the diaphragm which comes into contact with an article to be shaped thereon to assist in the shaping and removal of said article.

Each end of each of said wires may be provided with an enlargement, said enlargement preferably being in the form of a nipple, to assist in anchoring said wires to said end rings.

The end rings may be provided with at least one circumferentially extending rib, said rib being provided with axially extending slots in which said wires can be located.

The effective length of each said wire may be adjustable, and is preferably adjustable by the provision of washers on each of said wires, the removal of which effectively lengthens each of said wires.

Figure 2:
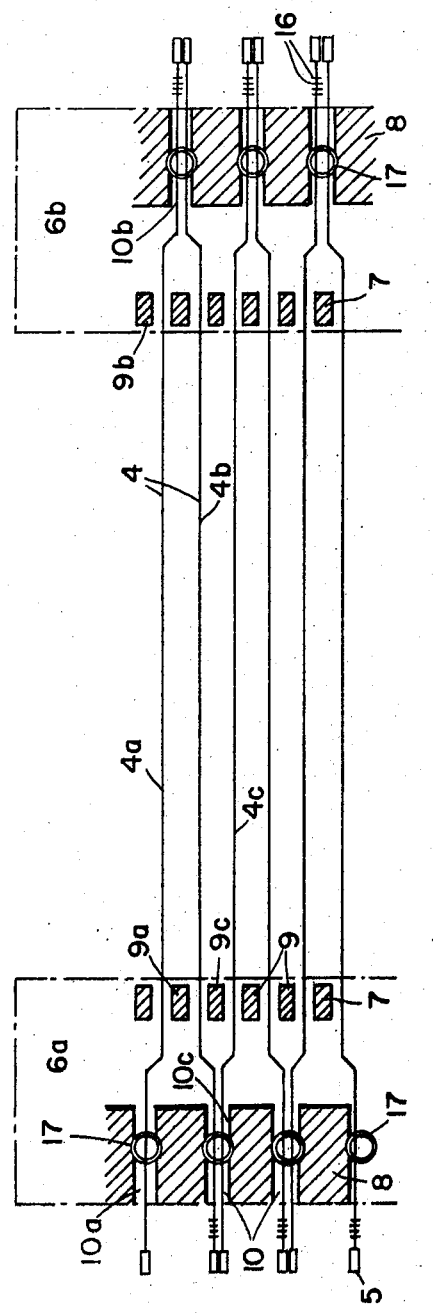

A diaphragm according to the invention will now be described, by way of example only, with reference to the accompanying drawings of which:

FIG. 1 shows a sectional view of part of a radial ply pneumatic tire shaping diaphragm according to the invention, and FIG. 2 shows a diagrammatic plan view of the location of wires in the diaphragm shown in FIG. 1.

The barrelled shaped diaphragm 1 comprises two layers of rubber 2 and 3 between which are located individual wires 4, each wire being provided with an enlargement in the form of a nipple 5 at each end. The ends of the wires 4 are anchored in end rings 6a and 6b which are provided with circumferentially extending ribs 7 and 8, provided with axially extending slots 9 and 10 respectively (see FIG. 2) in which the wires 4 are located. Each end ring 6a and 6b is provided with axially extending holes 11 for the location of bolts when the diaphragm 1 is assembled with a tire shaping machine.

The diaphragm 1 is provided with two diametrically opposite valves 12, only one of which is shown, each valve being provided with a bore 13 extending coaxially therewith connecting the interior 14 of the diaphragm 1 with the shaping surface 15 of said diaphragm 1.

The method of wiring said diaphragm 1 will now be described with reference to FIG. 2.

Each of the wires 4 are provided with washers 16 which allows the length of each wire 4 to be adjusted by the removal of said washers 16.

One end of a first wire 4a is located in slot 10a of the end ring 6a, being held in place by a grub screw 17 and is then located in slots 9a and 9b one slot in each end ring 6a and 6b respectively. The other end of said wire 4a is located in slot 10b in the other end ring 6b, the length of said wire 4a being adjusted by removal, if necessary, of washers 16. A metal pad 18 (see FIG. 1) is placed over the wire 4a to hold it in position. A second wire 4b is then located over the metal pad 18 in slot 10b and a grub screw 17 inserted until the correct tension is obtained in the wire 4a, the tensioning of the wires 4 being assisted by the ribs 8 which are provided with a cam surface 19 (see FIG. 1) on their axially outer surface, which surface 19 engaging with the nipples 5 and forcing the wires 4 axially outwardly of the diaphragm 1 as the grub screws 17 force the wires 4 radially inwardly of said diaphragm. The wire 4b is then located in slot 9c and 10c respectively, the tensioning procedure then being carried out using a metal pad 18, wire 4c and a grub screw 17. This procedure is carried out until the necessary number of wires are located around the circumference of the end rings 6a and 6b.

The construction of the diaphragm, according to the invention, comprising integral end rings obviates the necessity of providing split rings in which the axially outer edges of previously known diaphragms, i.e., of the type shown in the tire shaping apparatus disclosed in Great Britain Pat. No. 932,792, were located when the diaphragms were assembled with a shaping apparatus. With the diaphragm of the invention the end rings can be connected directly to the shaping apparatus.

Having now described our invention — what we claim is:

1. An annular wire reinforced rubber shaping diaphragm comprising a layer of rubber in which a plurality of individual wires are embedded, said wires being disposed substantially at right angles to the mid-circumferential plane of the diaphragm, and an end ring at each axially outer edge of said diaphragm, each end of each wire being anchored to its respective end ring.

2. A diaphragm according to claim 1 comprising at least one valve communicating between the interior of the diaphragm and a surface of the diaphragm which comes into contact with an article to be shaped thereon to assist in the shaping and removal of said article.

3. A diaphragm according to claim 1 wherein each end of each of said wires may be provided with an enlargement.

4. A diaphragm according to claim 3 wherein said enlargement is in the form of a nipple.

5. A diaphragm according to claim 1 comprising at least one circumferentially extending rib provided in each of said end rings, axially extending slots being provided in said ribs in which said wires can be located.

6. A diaphragm according to claim 5 wherein two circumferentially extending ribs are provided in each of said end rings, axially extending slots provided in said ribs in which said wires can be located.

7. A diaphragm according to claim 6 wherein the axially inner of said ribs has a number of slots equal to the number of individual wires located in said diaphragm and the axially outer of said ribs has a number of slots equal to one half the number of individual wires located in said diaphragm.

8. A diaphragm according to claim 5 wherein a cam surface is provided axially outwardly of the diaphragm on said rib whereby engagement of the enlargement at each end of each wire with said surface assists in tensioning said wires.

9. A diaphragm according to claim 6 wherein a cam surface is provided axially outwardly of the diaphragm on the axially outer rib whereby engagement of the enlargement at each end of each wire with said surface assists in tensioning said wires.

10. A diaphragm according to claim 6 wherein each individual wire is located in a slot in the axially inner rib and said wires are located in pairs in a slot in the axially outer rib.

11. A diaphragm according to claim 10 wherein each of the wires is located in axially opposite slots in the axially inner ribs whereby the wires are disposed substantially in radial planes of said diaphragm; opposite ends of each wire being paired in the slots in the axially outer ribs, one end with an end of one adjacent wire and the other end with an end of the other adjacent wire on the opposite side of the wire.

12. A diaphragm according to claim 5 wherein the slots of said at least one rib are provided with a screw-threaded portion for location of a screw whereby during manufacture of the diaphragm the wires are tensioned by the screw forcing the enlargement of the wire over the cam face of the axially outer rib.

13. A diaphragm according to claim 12 wherein a metal pad is located between said paired ends of said wires.

14. A diaphragm according to claim 1 wherein said rubber of the diaphragm extends to the axially outer edge of said end rings.

15. A diaphragm according to claim 1 wherein said wires have washers thereon whereby during manufacture of the diaphragm the effective length of said wires may be altered by removal of the washers.

* * * * *